United States Patent
Tao et al.

(10) Patent No.: US 11,114,977 B2
(45) Date of Patent: Sep. 7, 2021

(54) PHOTOVOLTAIC ARRAY FAULT DIAGNOSIS METHOD BASED ON RANDOM FOREST ALGORITHM

(71) Applicant: Jiangnan University, Wuxi (CN)

(72) Inventors: Hongfeng Tao, Wuxi (CN); Chaochao Zhou, Wuxi (CN); Jianqiang Shen, Wuxi (CN); Qiang Wei, Wuxi (CN); Wei Liu, Wuxi (CN); Longhui Zhou, Wuxi (CN)

(73) Assignee: Jiangnan University, Wuxi (CN)

( * ) Notice: Subject to any disclaimer, the term of this patent is extended or adjusted under 35 U.S.C. 154(b) by 179 days.

(21) Appl. No.: 16/557,220

(22) Filed: Aug. 30, 2019

(65) Prior Publication Data

US 2019/0386611 A1    Dec. 19, 2019

Related U.S. Application Data

(63) Continuation of application No. PCT/CN2018/102907, filed on Aug. 29, 2019.

(30) Foreign Application Priority Data

Aug. 10, 2018  (CN) .......................... 2018109075891

(51) Int. Cl.
    *H02S 50/10*    (2014.01)
(52) U.S. Cl.
    CPC .................................... *H02S 50/10* (2014.12)
(58) Field of Classification Search
    CPC ........... H02S 50/10; H02S 50/00; Y02E 10/50
    See application file for complete search history.

(56) References Cited

U.S. PATENT DOCUMENTS

2019/0312547 A1*   10/2019   Azad ...................... H02S 50/10

FOREIGN PATENT DOCUMENTS

| CN | 105141255 A | 12/2015 |
| CN | 106961249 A | 7/2017 |

(Continued)

OTHER PUBLICATIONS

Xu, X., Wang, H., & Zuo, Y. (Mar. 2011). Method for diagnosing photovoltaic array fault in solar photovoltaic system. In 2011 Asia-Pacific Power and Energy Engineering Conference (pp. 1-5). IEEE. (Year: 2011).*

(Continued)

*Primary Examiner* — Catherine T. Rastovski
*Assistant Examiner* — Aeysha N Sultana
(74) *Attorney, Agent, or Firm* — IPro, PLLC

(57) ABSTRACT

The present disclosure discloses a photovoltaic array fault diagnosis method and apparatus based on a random forest algorithm. A strong classifier is constructed with many weak classifiers by integrating a plurality of decision trees, diagnosis results are generated by voting, and even if the diagnosis result of the most votes is wrong, the diagnosis results of the second and third more votes can be taken for reference of maintenance personnel, thereby improving the maintenance efficiency, and shortening the fault time of a system. The method and the apparatus resolve the problems of large data volume, long training time and the like of the conventional neural network algorithm, and can simply and quickly complete a diagnosis task and quickly implement the fault diagnosis of a small photovoltaic array, especially a 3×2 photovoltaic array.

10 Claims, 9 Drawing Sheets

(56) References Cited

FOREIGN PATENT DOCUMENTS

| CN | 107579707 | A | | 1/2018 |
|----|-----------|---|---|--------|
| CN | 108062571 | A | | 5/2018 |
| CN | 108303632 | A | | 7/2018 |
| CN | 107274105 | B | * | 10/2020 |

OTHER PUBLICATIONS

Jianeng, T., Yongqiang, Z., & Wenshan, W. (Sep. 2011). Fault diagnosis method and simulation analysis for photovoltaic array. In 2011 International Conference on Electrical and Control Engineering (pp. 1569-1573). IEEE. (Year: 2011).*
Zhao, Y., Yang, L., Lehman, B., de Palma, J. F., Mosesian, J., & Lyons, R. (Feb. 2012). Decision tree-based fault detection and classification in solar photovoltaic arrays. In 2012 Twenty-Seventh Annual IEEE Applied Power Electronics Conference and Exposition (APEC) (pp. 93-99). IEEE (Year: 2012).*
Appiah, A. Y., Zhang, X., Ayawli, B. B. K., & Kyeremeh, F. (2019). Review and performance evaluation of photovoltaic array fault detection and diagnosis techniques. International Journal of Photo energy, 2019 (Year: 2019).*
Bird, M., Acha, S., Le Brun, N., & Shah, N. (2019). Assessing the Modelling Approach and Datasets Required for Fault Detection in Photovoltaic Systems. In 2019 IEEE Industry Applications Society Annual Meeting (pp. 1-6). IEEE. (Year: 2019).*
Pahwa, K., Sharma, M., Saggu, M. S., & Mandpura, A. K. (Feb. 2020). Performance Evaluation of Machine Learning Techniques for Fault Detection and Classification in PV Array Systems. In 2020 7th International Conference on Signal Processing and Integrated Networks (SPIN) (pp. 791-796). IEEE. (Year: 2020).*

* cited by examiner

PHOTOVOLTAIC ARRAY FAULT DIAGNOSIS METHOD BASED ON RANDOM FOREST ALGORITHM

TECHNICAL FIELD

The present disclosure relates to a photovoltaic array fault diagnosis method based on a random forest algorithm, belonging to the field of photovoltaic technology.

BACKGROUND

With the growth of energy demand, the increasing depletion of fossil energy and rising costs, as well as the impact of many factors such as global warming, renewable energy technologies have developed rapidly. Solar energy has the advantages of being easy to obtain, noise-free, clean infinite and the like, and has become an important part of renewable energy. At present, solar power generation are mainly in two forms: photo-thermal power generation and photovoltaic power generation. The photo-thermal power generation is similar to thermal power generation, but its thermal energy mainly comes from large-scale mirror collection. After water is heated, steam is used to drive the conventional generator to work and thus generate power. This power generation method avoids photoelectric conversion of silicon crystal, but has a high requirement for light intensity and high power generation cost. The photovoltaic power generation based on a photovoltaic effect directly converts solar energy into electrical energy, is short in construction period, and does not produce waste residue, waste water and other pollutants during operation. Especially for mountainous areas with underdeveloped traffic, islands and remote areas, the photovoltaic power generation has more important value.

Generally, the photovoltaic power generation is operated by means of photovoltaic cell modules connected in series or in parallel to form a photovoltaic array. Many photovoltaic cell modules having high fault probability are used in the photovoltaic array, and the photovoltaic array is prone to aging, damage and the like when operated in an outdoor harsh environment for a long term. Thus, the power generation efficiency of the photovoltaic cell modules decreases and even the photovoltaic cell modules stop operating. After some photovoltaic cell module in the photovoltaic array has a fault, the efficiency of a system decreases, the operation and scheduling of the power system are adversely affected, and even property damage and casualties are caused in severe cases. Therefore, the fault diagnosis on the photovoltaic array is of great significance. Fault diagnosis methods currently used mainly include two types, i.e., direct methods and indirect methods. The indirect methods typically include an infrared heat detection method and a power generation power comparison method. The direct methods typically include an earth capacitance method, a time domain reflectometry, an intelligent diagnosis algorithm, and an electrical characteristic detection method. Combining the intelligent diagnosis algorithm and the electrical characteristic detection method for fault diagnosis is currently a very promising method. The current intelligent diagnosis algorithms mostly use a neural network represented by BP (Back Propagation). Because the photovoltaic array may have many types of faults, a large amount of training samples and training time are needed, the algorithm structure is complex, the implementation is difficult, the diagnosis time is too long, and the accuracy and reliability of diagnosis are low.

SUMMARY

In view of the above problems and technical requirements, the inventors propose a photovoltaic array fault diagnosis method based on a random forest algorithm. Based on the idea of data driving, the method constructs a fault diagnosis model by using the random forest algorithm, which is suitable for the characteristics of an actual photovoltaic array, resolves the problems of large data volume, long training time and the like of the conventional neural network algorithm, and can complete a diagnosis task simply and quickly.

The technical solution of the present disclosure is as follows:

A photovoltaic array fault diagnosis method based on a random forest algorithm includes:

determining typical operating states of a photovoltaic array during operation, the photovoltaic array including n branches, each branch including m photovoltaic modules, m and n being positive integers, and m≤4 and n≤4;

acquiring circuit parameter groups corresponding to each branch and a trunk in the photovoltaic array respectively when the photovoltaic array is in each typical operating state, each circuit parameter group including k circuit parameters, and k being a positive integer; constructing a p-dimensional fault feature vector according to the acquired n+1 circuit parameter groups, where p=k*(n+1);

constructing a data sample set of the photovoltaic array according to the fault feature vector, and dividing the data sample set into a training sample set and a test sample set;

constructing a photovoltaic array fault diagnosis model based on the random forest algorithm by using the training sample set, and testing the photovoltaic array fault diagnosis model by using the test sample set, the photovoltaic array fault diagnosis model including s decision trees, s≥2 and s being a positive integer;

diagnosing a photovoltaic array to be diagnosed by using the tested photovoltaic array fault diagnosis model to obtain voting results of the s decision trees for each typical operating state; and obtaining a fault diagnosis result of the photovoltaic array to be diagnosed according to the voting results for each typical operating state, the fault diagnosis result being used to indicate an operating state of each branch in the photovoltaic array.

Optionally, constructing a photovoltaic array fault diagnosis model based on the random forest algorithm by using the training sample set includes:

performing s times of sampling with replacement on the training sample set, where a sub-training sample set is obtained by each sampling, and a total of s sub-training sample sets are obtained;

training by using each sub-training sample set to obtain a decision tree; and summarizing the s decision trees obtained by the training to obtain a set, that is, the photovoltaic array fault diagnosis model.

Optionally, in the process of training the decision tree by using the sub-training sample set, when node splitting is performed, q fault features are randomly selected from p fault features, where q is a positive integer and q≤p; and a Gini coefficient corresponding to each fault feature in the q fault features is calculated, and the fault feature corresponding to the minimum Gini coefficient is used as an optimal splitting feature for node splitting.

Optionally, k=4, and each circuit parameter group includes an open-circuit voltage, a short-circuit current, a maximum power point voltage, and a maximum power point current.

Optionally, when n=2 and m=3, the photovoltaic array has five categories, totally twelve subcategories of typical operating states, respectively:

the first category is a normal operating state, and the first category includes one subcategory, which is a state when each photovoltaic module in each branch of the photovoltaic array is in normal operation;

the second category is a short-circuit fault state, and the second category includes three subcategories, respectively a state when one photovoltaic module in one branch of the photovoltaic array is short-circuited, a state when two photovoltaic modules in one branch of the photovoltaic array are short-circuited, and a state when one photovoltaic module in each of two branches of the photovoltaic array is short-circuited;

the third category is an open-circuit fault state, and the third category includes one subcategory, which is a state when one branch of the photovoltaic array is open-circuited;

the fourth category is a shadow fault state, and the fourth category includes three subcategories, respectively a state when one photovoltaic module in one branch of the photovoltaic array has a shadow, a state when one photovoltaic module in each of two branches of the photovoltaic array has a shadow, a state when one photovoltaic module in one branch of the photovoltaic array has a shadow and two photovoltaic modules in the other branch have shadows, and a state when two photovoltaic modules in each of two branches of the photovoltaic array have shadows; and the fifth category is a hybrid fault state, and the fifth category includes four subcategories, respectively a state when one branch of the photovoltaic array is open-circuited and one photovoltaic module in the other branch has a shadow, a state when one photovoltaic module in one branch of the photovoltaic array is short-circuited and one photovoltaic module in the other branch has a shadow, a state when one photovoltaic module is short-circuited and one photovoltaic module has a shadow in each of two branches of the photovoltaic array, and a state when one photovoltaic module is short-circuited and two photovoltaic modules have shadows in each of two branches of the photovoltaic array.

The present disclosure provides a photovoltaic array fault diagnosis apparatus based on a random forest algorithm, including:

a circuit parameter group acquisition module, a fault feature vector construction module, a data sample set division module, a fault diagnosis model construction module, and a diagnosis module;

wherein the circuit parameter group acquisition module is configured to acquire circuit parameter groups corresponding to each branch and a trunk in the photovoltaic array respectively when a photovoltaic array is in each typical operating state, each circuit parameter group including k circuit parameters, and k being a positive integer; the photovoltaic array including n branches, each branch including m photovoltaic modules, m and n being positive integers, and m≤4 and n≤4;

the fault feature vector construction module is configured to construct a p-dimensional fault feature vector according to the n+1 circuit parameter groups acquired by the circuit parameter group acquisition module, where p=k*(n+1);

the data sample set division module is configured to construct a data sample set of the photovoltaic array according to the fault feature vector constructed by the fault feature vector construction module, and divide the data sample set into a training sample set and a test sample set;

the fault diagnosis model construction module is configured to construct a photovoltaic array fault diagnosis model based on the random forest algorithm by using the training sample set;

the diagnosis module is configured to test the photovoltaic array fault diagnosis model by using the test sample set, the photovoltaic array fault diagnosis model including s decision trees, s≥2, and s being a positive integer; diagnose a photovoltaic array to be diagnosed by using the photovoltaic array fault diagnosis model after the test is completed, to obtain voting results of the s decision trees for each typical operating state; and obtain a fault diagnosis result of the photovoltaic array to be diagnosed according to the voting results for each typical operating state, the fault diagnosis result being used to indicate an operating state of each branch in the photovoltaic array.

Optionally, the fault diagnosis model construction module constructs the photovoltaic array fault diagnosis model by using the training sample set, including:

performing s times of sampling with replacement on the training sample set, where a sub-training sample set is obtained by each sampling, and a total of s sub-training sample sets are obtained;

training by using each sub-training sample set to obtain a decision tree; and summarizing the s decision trees obtained by the training to obtain a set, that is, the photovoltaic array fault diagnosis model.

Optionally, in the process of training the decision tree by using the sub-training sample set, when node splitting is performed, q fault features are randomly selected from p fault features, where q is a positive integer and q≤p; and a Gini coefficient corresponding to each fault feature in the q fault features is calculated, and the fault feature corresponding to the minimum Gini coefficient is used as an optimal splitting feature for node splitting.

Optionally, when the circuit parameter group acquisition module acquires circuit parameter groups corresponding to each branch and a trunk in the photovoltaic array, each circuit parameter group includes an open-circuit voltage, a short-circuit current, a maximum power point voltage, and a maximum power point current.

Optionally, when n=2 and m=3, the photovoltaic array has five categories, totally twelve subcategories of typical operating states, respectively:

the first category is a normal operating state, and the first category includes one subcategory, which is a state when each photovoltaic module in each branch of the photovoltaic array is in normal operation;

the second category is a short-circuit fault state, and the second category includes three subcategories, respectively a state when one photovoltaic module in one branch of the photovoltaic array is short-circuited, a state when two photovoltaic modules in one branch of the photovoltaic array are short-circuited, and a state when one photovoltaic module in each of two branches of the photovoltaic array is short-circuited;

the third category is an open-circuit fault state, and the third category includes one subcategory, which is a state when one branch of the photovoltaic array is open-circuited;

the fourth category is a shadow fault state, and the fourth category includes three subcategories, respectively a state when one photovoltaic module in one branch of the photovoltaic array has a shadow, a state when one photovoltaic module in each of two branches of the photovoltaic array has a shadow, a state when one photovoltaic module in one branch of the photovoltaic array has a shadow and two photovoltaic modules in the other branch have shadows, and a state when two photovoltaic modules in each of two branches of the photovoltaic array have shadows; and the fifth category is a hybrid fault state, and the fifth category includes four subcategories, respectively a state when one branch of the photovoltaic array is open-circuited and one photovoltaic module in the other branch has a shadow, a state when one photovoltaic module in one branch of the photovoltaic array is short-circuited and one photovoltaic module in the other branch has a shadow, a state when one photovoltaic module is short-circuited and one photovoltaic module has a shadow in each of two branches of the photovoltaic array, and a state when one photovoltaic module is short-circuited and two photovoltaic modules have shadows in each of two branches of the photovoltaic array.

The present disclosure provides a photovoltaic circuit diagnosis method, which diagnoses a photovoltaic circuit by using the photovoltaic array fault diagnosis method based on a random forest algorithm and/or the photovoltaic array fault diagnosis apparatus based on a random forest algorithm, where the photovoltaic circuit is a small photovoltaic array, the number of branches of the small photovoltaic array is less than or equal to 4, and the number of photovoltaic modules connected in series in each branch is less than or equal to 4.

The present disclosure has the following beneficial technical effects:

1. The present application discloses a photovoltaic array fault diagnosis method based on a random forest algorithm. Based on the idea of data driving, the method constructs a photovoltaic array fault diagnosis model by using the random forest algorithm, which is suitable for the characteristics of an actual photovoltaic array, resolves the problems of large data volume, long training time and the like of the conventional neural network algorithm, and can simply and quickly complete a diagnosis task and quickly implement the fault diagnosis of a small photovoltaic array, especially a 3×2 photovoltaic array.

2. In the present disclosure, a fault diagnosis model structure of random forest is used, a plurality of decision trees is integrated, a strong classifier is constructed by many weak classifiers, diagnosis results are generated by voting, and even if the diagnosis result of the most votes is wrong, the diagnosis results of the second and third more votes can be taken for reference of maintenance personnel, thereby improving the maintenance efficiency, and shortening the fault time of a system.

BRIEF DESCRIPTION OF FIGURES

In order to more clearly illustrate the technical solutions in the embodiments of the present disclosure, the drawings used in the description of the embodiments will be briefly introduced below. Obviously, the drawings in the following description are only some embodiments of the present disclosure, and those of ordinary skill in the art may obtain other drawings according to the drawings without any creative effort.

DETAILED DESCRIPTION

To make the objectives, technical solutions and advantages of the present disclosure clearer, the following further describes the embodiments of the present disclosure in detail with reference to the accompanying drawings.

Embodiment 1

Figure 1:
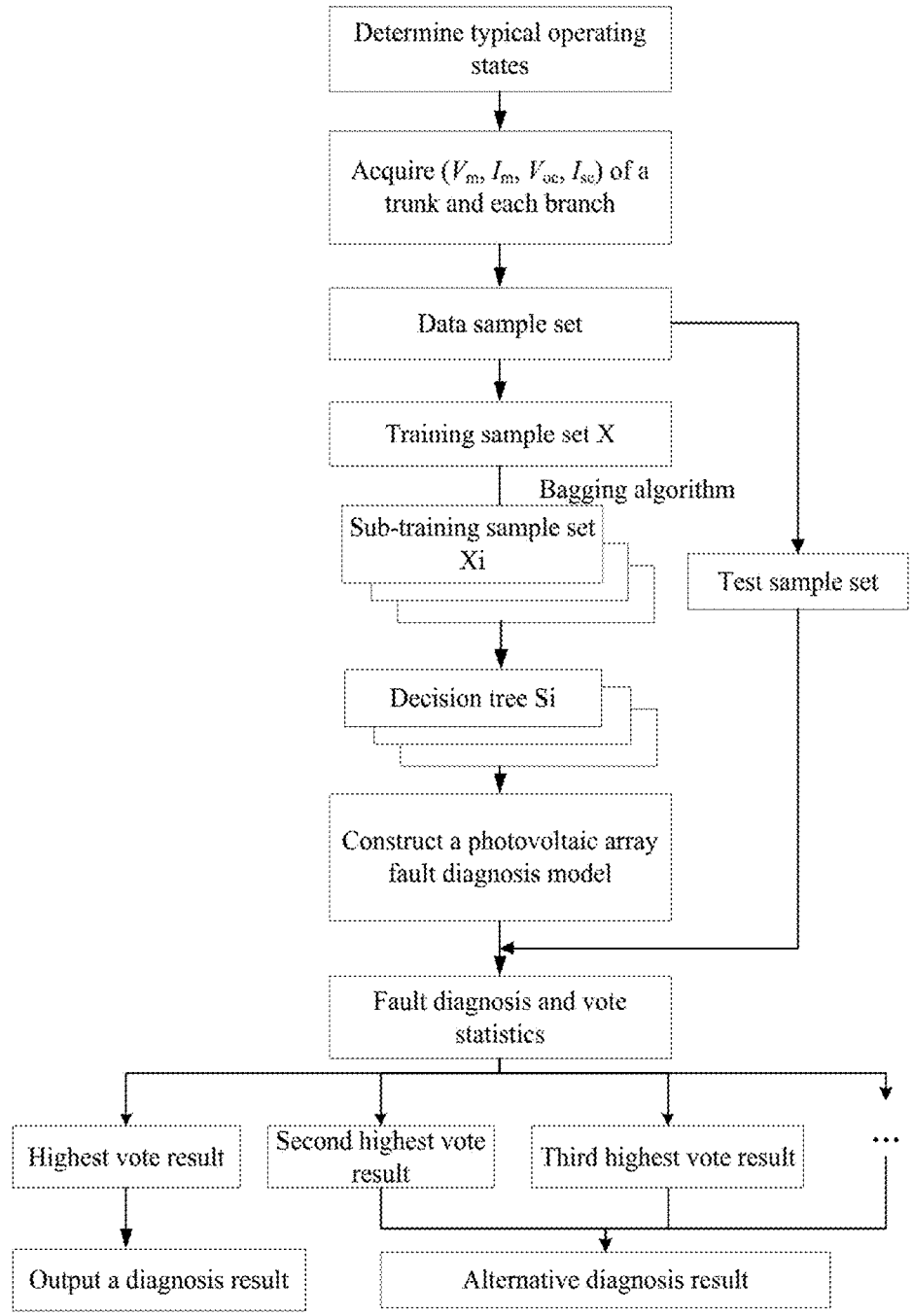
FIG. 1 is a flowchart of a photovoltaic array fault diagnosis method according to the present disclosure.
Figure 2A:
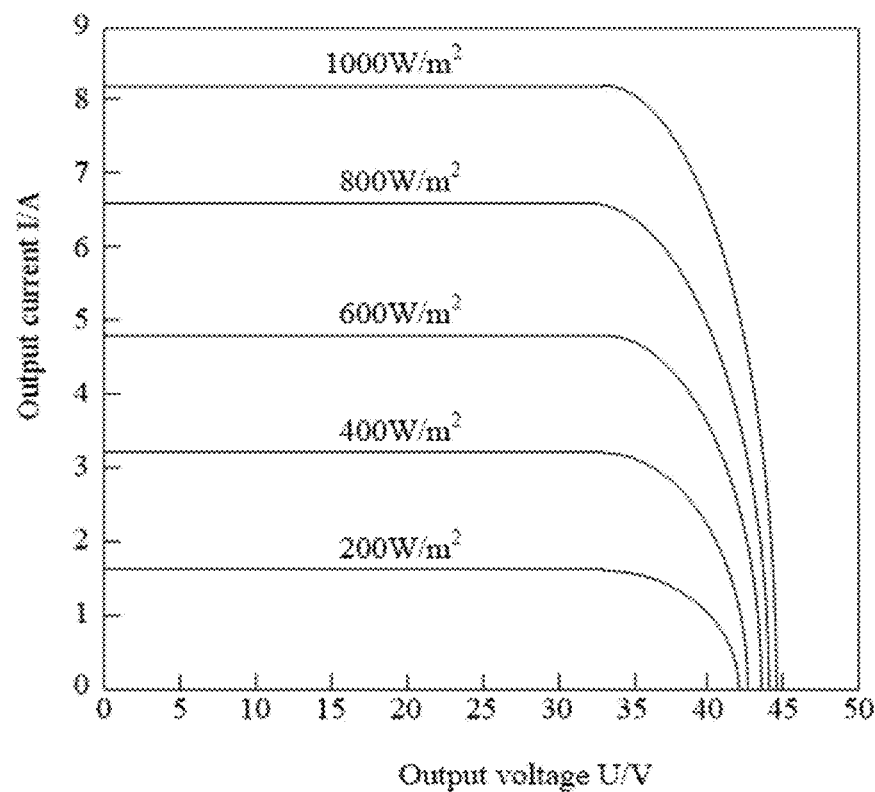
FIG. 2A shows U-I output characteristic curves of a single solar cell module at different light intensities.
Figure 2B:
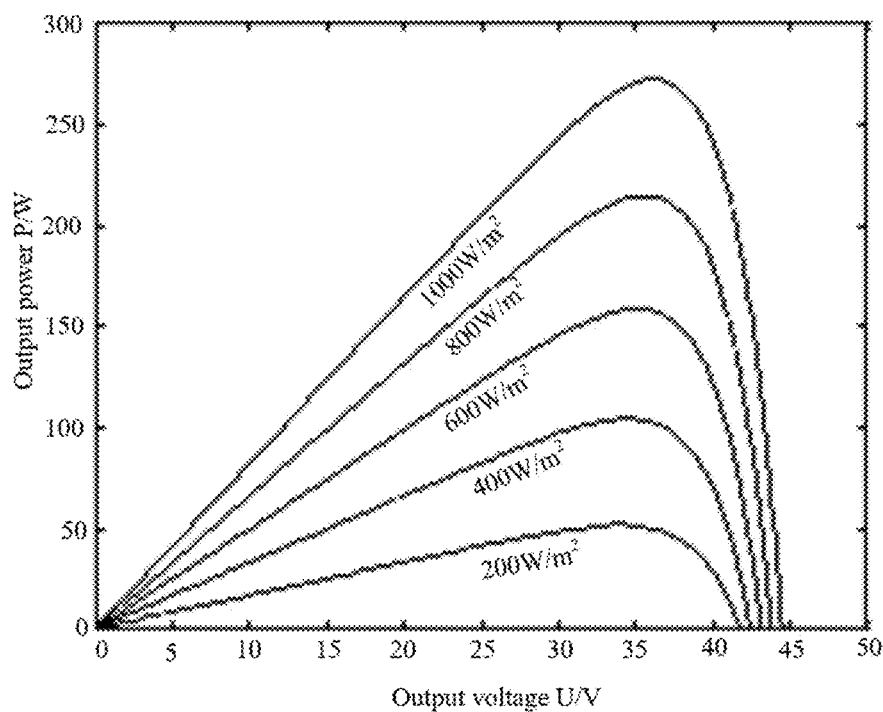
FIG. 2B shows U-P output characteristic curves of a single solar cell module at different light intensities.
Figure 2C:
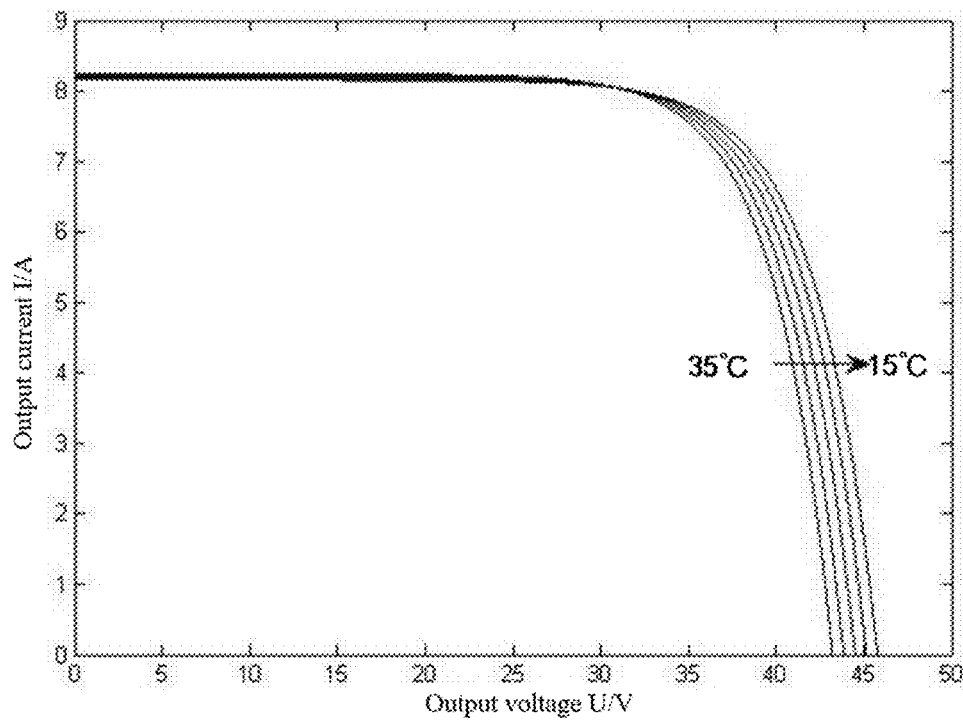
FIG. 2C shows U-I output characteristic curves of a single solar cell module at different temperatures.
Figure 2D:
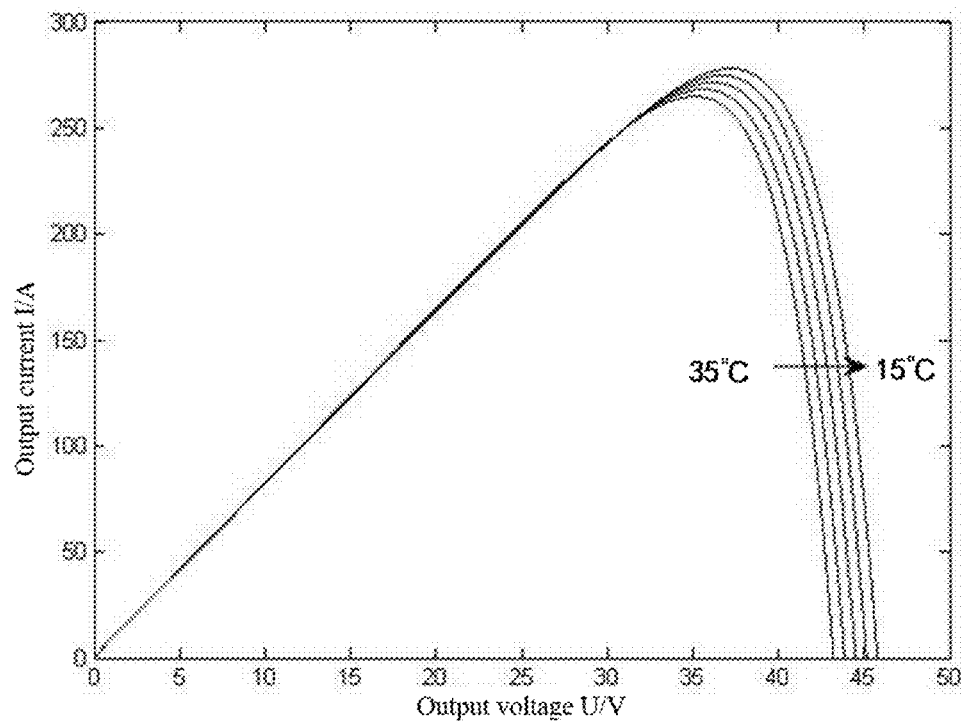
FIG. 2D shows U-P output characteristic curves of a single solar cell module at different temperatures.

The present embodiment provides a photovoltaic array fault diagnosis method based on a random forest algorithm. Referring to FIG. 1, an entire fault diagnosis process includes the following steps:

Step 1, a photovoltaic array in the form of m*n is constructed. The photovoltaic array includes n branches in parallel, each branch includes m photovoltaic modules connected in series, and m and n are positive integers. The photovoltaic modules in the array are usually solar cell modules, and are in the same specification to ensure a potential balance of the photovoltaic array. In addition, protection and detection devices such as bypass diodes, isolation diodes, fast fuses, and voltage and current sensors are installed correctly and operated normally. In practical implementation, the method disclosed in the present application is more suitable for a small photovoltaic array, so generally, m≤4 and n≤4.

The present application is described using a more typical case of n=2 and m=3 as an example. The photovoltaic array is constructed using six SunTech STP 270-24/Vd type solar cell modules of Wuxi SunTech Solar Energy Co., Ltd. A parameter specification table of this type of solar cell module is shown as the following table:

TABLE 1

Parameter specifications of solar cell modules selected

| Parameter Type | Parameter Value |
|---|---|
| Open-circuit voltage (Voc) | 44.5 V |
| Maximum power point voltage (Vm) | 35.0 V |
| Short-circuit current (Isc) | 8.20 A |
| Maximum power point current (Im) | 7.71 A |
| Maximum power (Pmax) | 270 W |
| Operating temperature | −40° C.~+85° C. |
| Maximum withstand voltage of system | 1000 V DC |
| Rated current of fuses connected in series | 20 A |
| Power error | ±3% |

For a single solar cell module, U-I (voltage-current) output characteristic curves are shown in FIG. 2-$a$ and U-P (voltage-power) output characteristic curves are shown in FIG. 2-$b$ at the same temperature and different light intensities; and the U-I output characteristic curves are shown in FIG. 2-$c$ and the U-P output characteristic curves are shown in FIG. 2-$d$ at the same light intensity from 35° C. to 15° C. (respectively 35° C., 30° C., 25° C., 20° C. and 15° C. in the figures).

Figure 3:
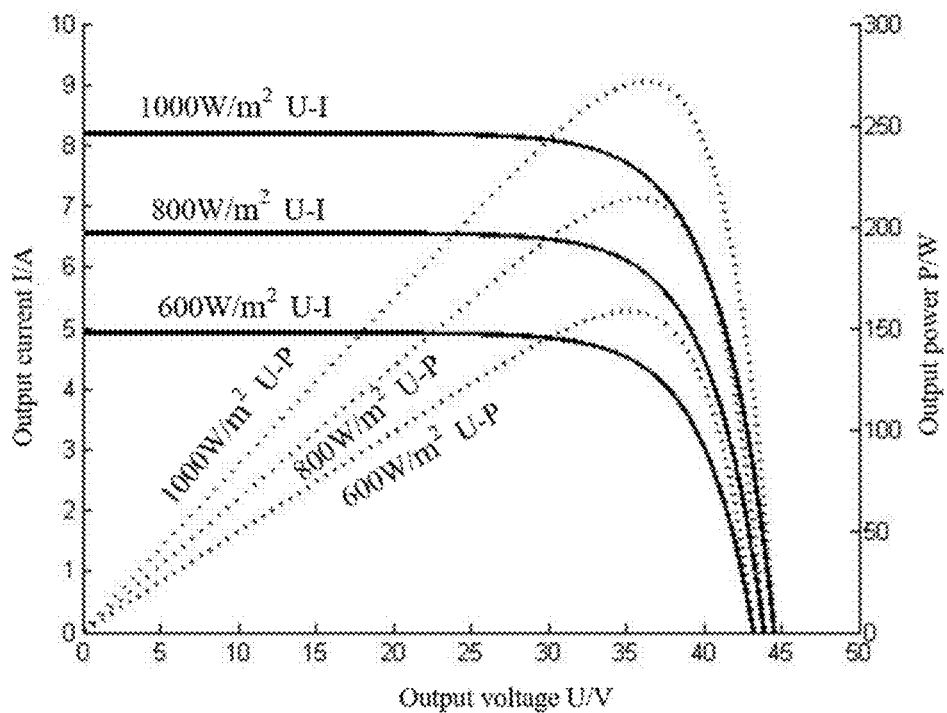
FIG. 3 shows output characteristic curves of a single solar cell module at the light intensities of 600 W/m2, 800 W/m2, and 1000 W/m2.
Figure 4A:
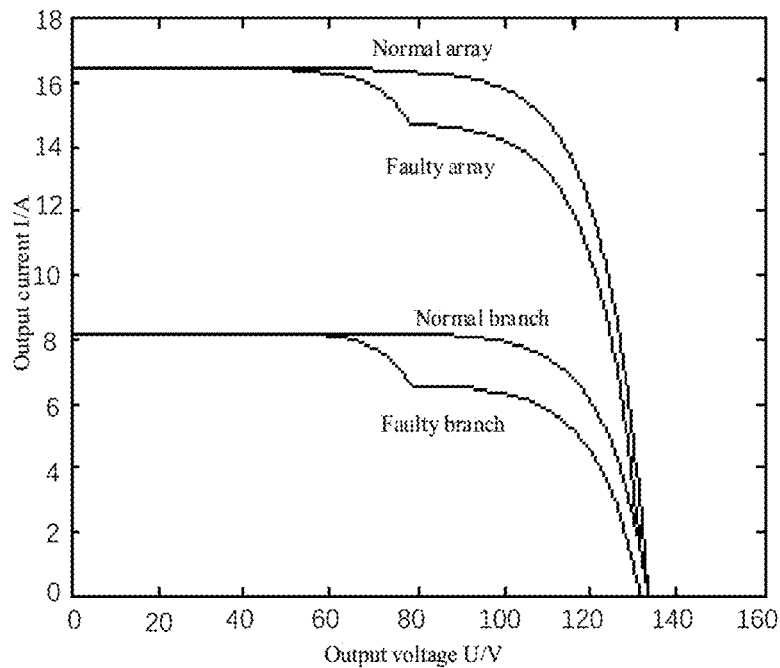
FIG. 4A shows U-I output characteristic curves when one branch in a photovoltaic array has a fault.
Figure 4B:
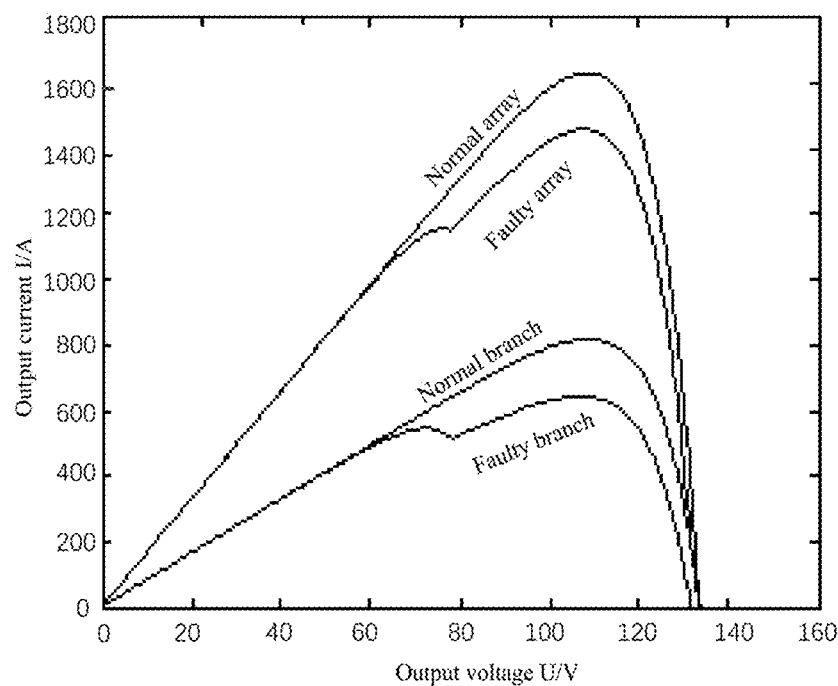
FIG. 4B shows U-P output characteristic curves when one branch in the photovoltaic array has a fault.
Figure 4C:
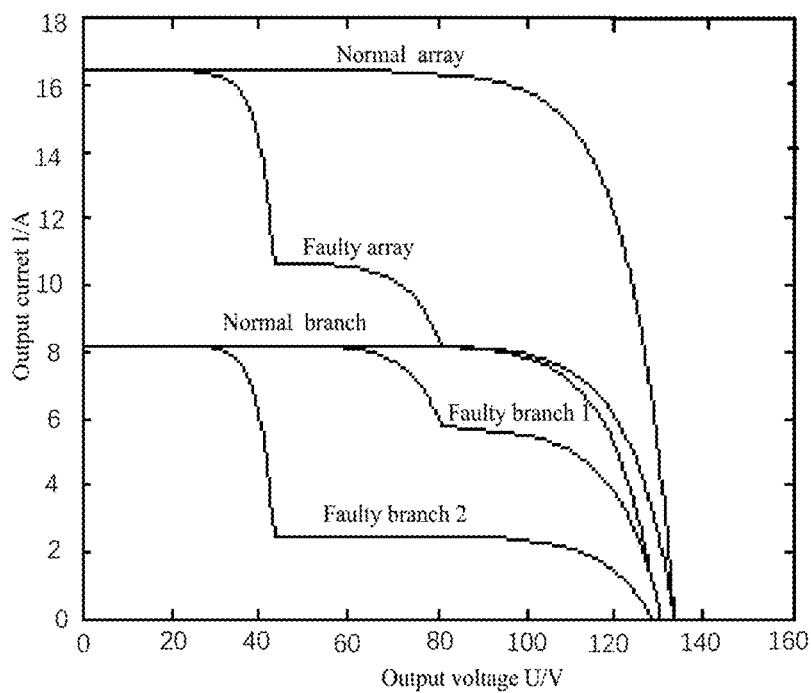
FIG. 4C shows U-I output characteristic curves when two branches in the photovoltaic array have a fault.
Figure 4D:
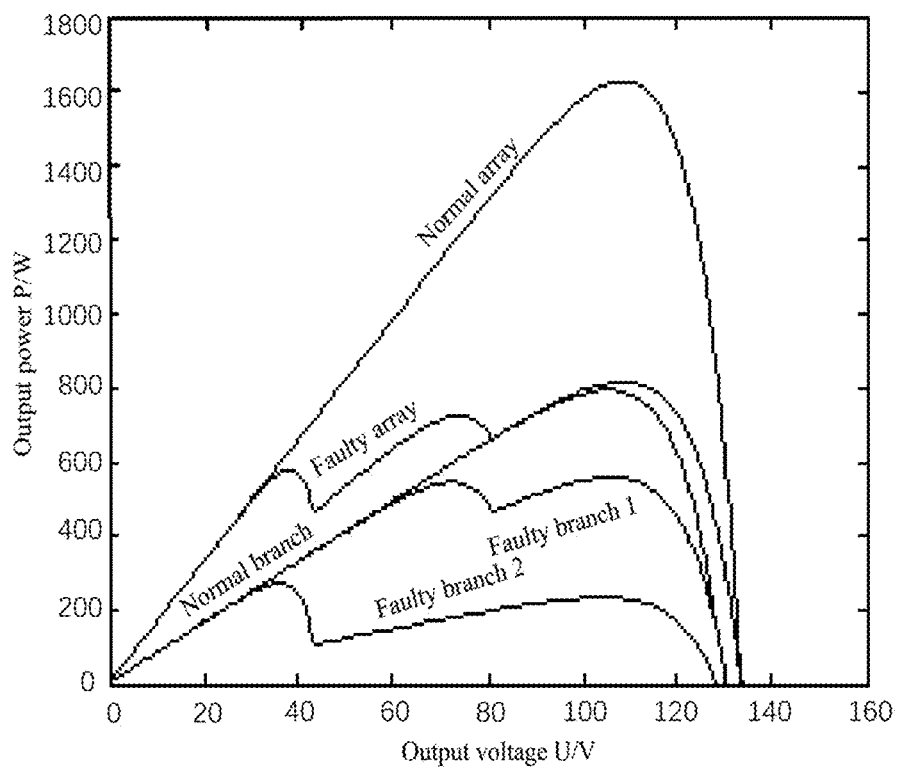
FIG. 4D shows U-P output characteristic curves when two branches in the photovoltaic array have a fault.
Figure 5A:
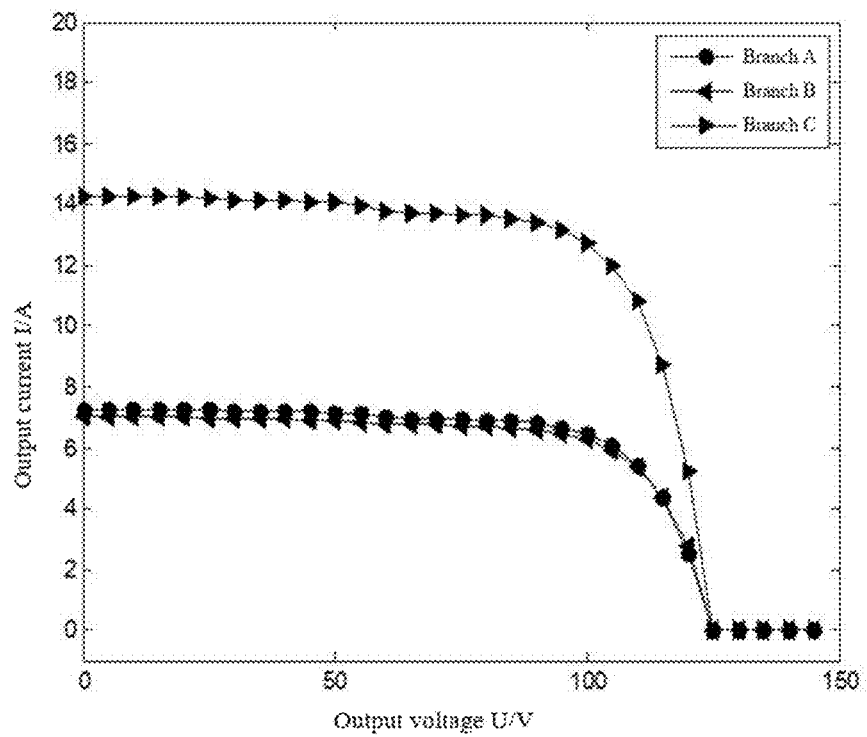
FIG. 5A shows U-I output characteristic curves when the photovoltaic array is in an operating state corresponding to a state label F1.
Figure 5B:
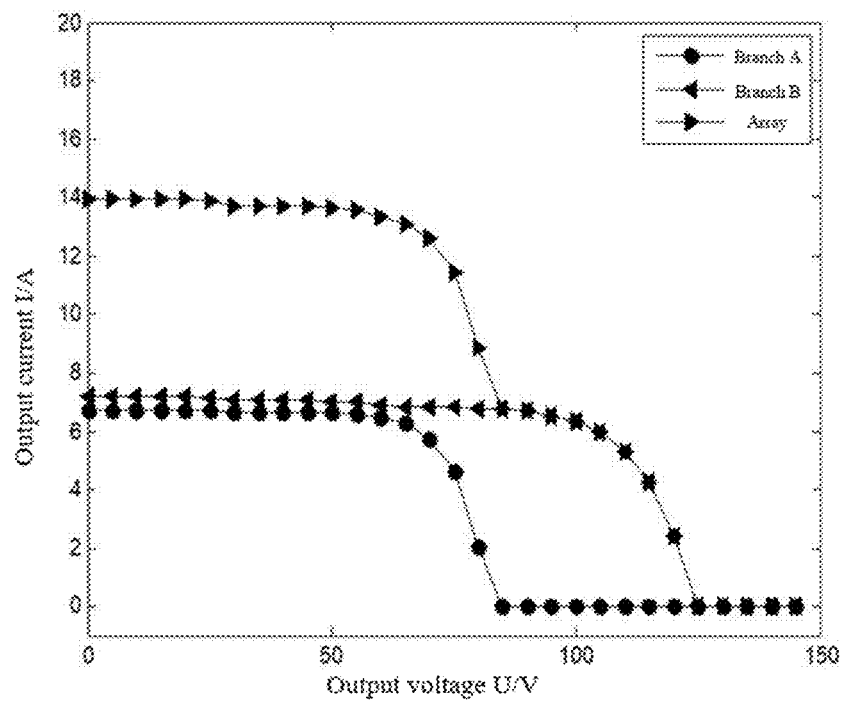
FIG. 5B shows U-I output characteristic curves when the photovoltaic array is in an operating state corresponding to a state label F2.
Figure 5C:
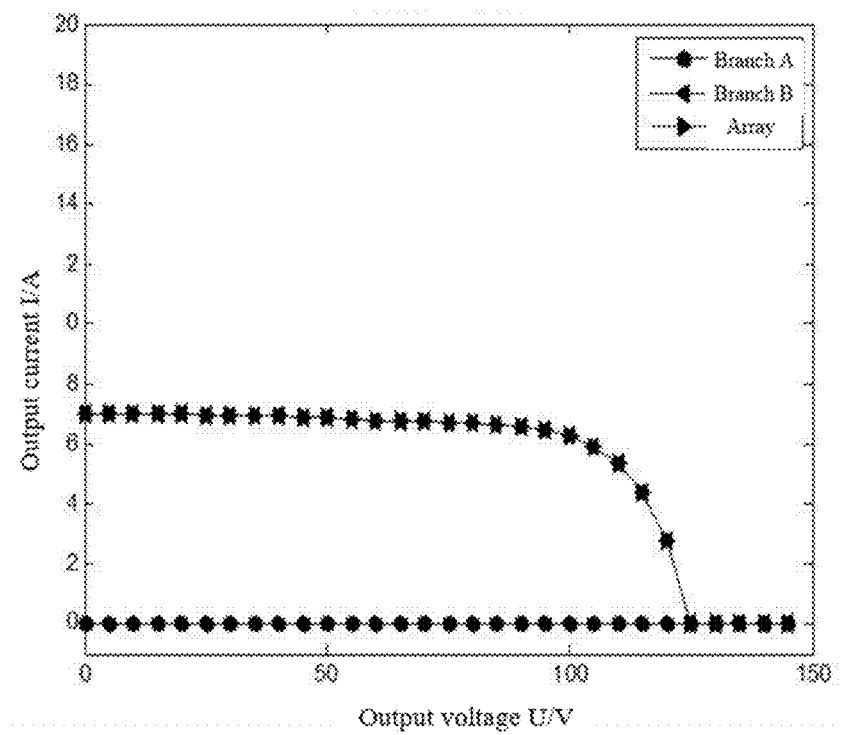
FIG. 5C shows U-I output characteristic curves when the photovoltaic array is in an operating state corresponding to a state label F5.
Figure 5D:
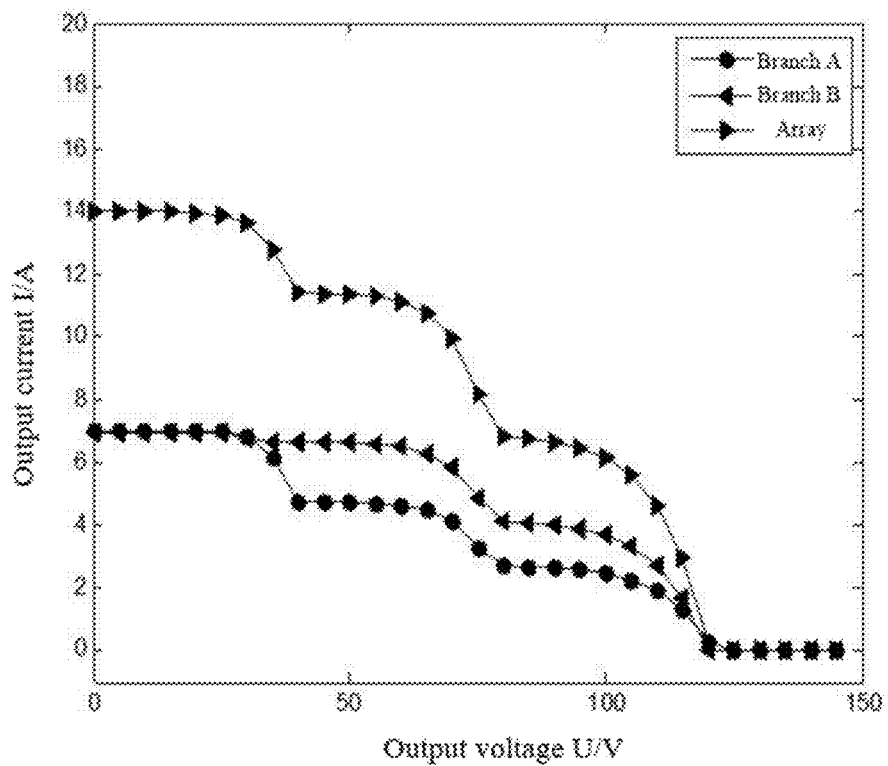
FIG. 5D shows U-I output characteristic curves when the photovoltaic array is in an operating state corresponding to a state label F8.
Figure 5E:
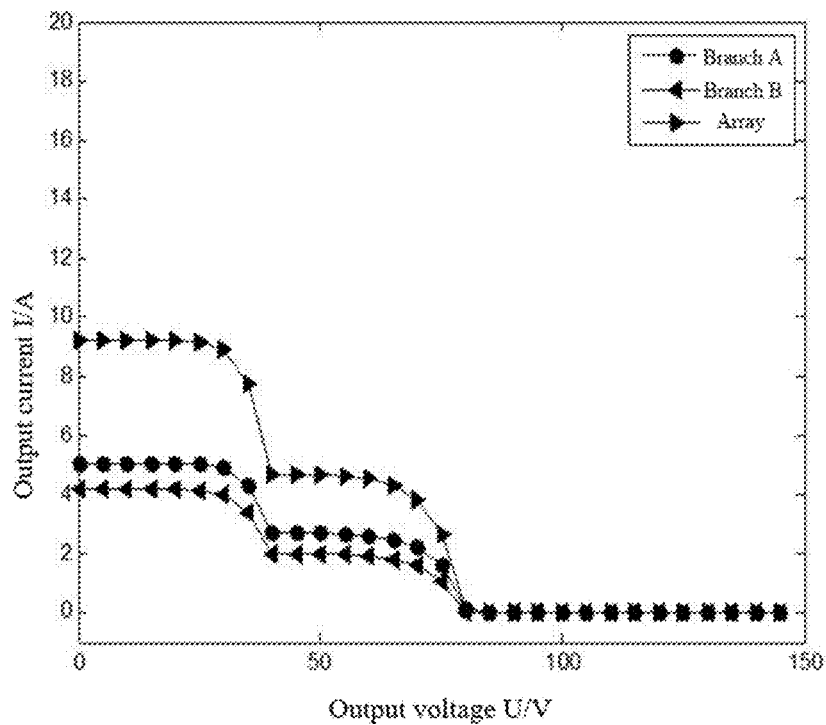
FIG. 5E shows U-I output characteristic curves when the photovoltaic array is in an operating state corresponding to a state label F13.

It can be seen that, as the light intensity increases and the environmental temperature decreases, the output power of the solar cell module increases, and the amount of power generation increases. The output characteristic curves at the light intensities of 600 W/m2, 800 W/m2, and 1000 W/m2 are shown in FIG. 3.

Step 2, typical operating states of the photovoltaic array during operation are determined, the typical operating states of the photovoltaic array being used to indicate the operating states of respective branches in the photovoltaic array. The photovoltaic array may have many types of faults during practical operation, mainly including four types: a short-circuit fault, an open-circuit fault, a shadow fault, and a hybrid fault. In addition to the normal operation, the operating states of the photovoltaic array mainly include five categories: a normal operation state, a short-circuit fault state, an open-circuit fault state, a shadow fault state, and a hybrid fault state.

When one or more branches in the photovoltaic array have faults, the output characteristic curves of the faulty branch and the entire photovoltaic array change. FIGS. 4-$a$ to 4-$d$ respectively show output characteristic curves of a faulty branch, a faulty array, a normal branch, and a normal array in difference cases. The normal branch refers to a branch in normal operation, the normal array refers to a photovoltaic array when each branch is in normal operation, the faulty branch refers to a branch in which a fault occurs, and the faulty array refers to a photovoltaic array in which a branch has a fault. Specifically, the U-I output characteristic curves when one branch in the photovoltaic array has a fault are shown in FIG. 4-$a$; the U-P output characteristic curves when one branch has a fault are shown in FIG. 4-$b$; the U-I output characteristic curves when two branches have faults are shown in FIG. 4-$c$; and the U-P output characteristic curves when two branches have faults are shown in 4-$d$. It can be seen from the figures that, when the fault of a photovoltaic module results in the fault of a branch where the photovoltaic module is located, each of the faulty branch and the entire photovoltaic array has an obvious power loss, the output characteristic curves of the normal branch and the normal array present unimodal characteristics, while the fault branch and the fault array present multi-peak characteristics.

The five categories of operating states of the photovoltaic array may be further divided into a plurality of subcategories. In fact, some of the most common subcategories may be selected as the typical operating states of the photovoltaic array, and the specific selection may be based on practical experience. For example, in the example of n=2 and m=3 of the present application, thirteen subcategories of the most common operating states may be selected from the categories of operating states as the typical operating states, respectively:

(1) The first category is a normal operating state, and the first category includes one subcategory, which is a state when each photovoltaic module in each branch of the photovoltaic array is in normal operation.

(2) The second category is a short-circuit fault state, and the second category includes three subcategories, respectively a state when one photovoltaic module in one branch of the photovoltaic array is short-circuited, a state when two photovoltaic modules in one branch of the photovoltaic array are short-circuited, and a state when one photovoltaic module in each of two branches of the photovoltaic array is short-circuited.

It should be noted that the short-circuit fault may be regarded as a special shadow fault: the photovoltaic module is completely shielded, cannot operate and is short-circuited by a bypass diode during a whole course, but unlike the shadow fault, at most two branches are short-circuited in one branch, and if all photovoltaic modules are short-circuited, a fusing device is fused and the branch is open-circuited.

(3) The third category is an open-circuit fault state, and the third category includes one subcategory, which is a state when one branch of the photovoltaic array is open-circuited.

(4) The fourth category is a shadow fault state, and the fourth category includes three subcategories, respectively a state when one photovoltaic module in one branch of the photovoltaic array has a shadow, a state when one photovoltaic module in each of two branches of the photovoltaic array has a shadow, a state when one photovoltaic module in one branch of the photovoltaic array has a shadow and two photovoltaic modules in the other branch have shadows, and a state when two photovoltaic modules in each of two branches of the photovoltaic array have shadows. It should be noted that the shadow fault is different from the short-circuit fault, and all the photovoltaic modules may have shadows.

(5) The fifth category is a hybrid fault state, and the fifth category includes four subcategories, respectively a state when one branch of the photovoltaic array is open-circuited and one photovoltaic module in the other branch has a shadow, a state when one photovoltaic module in one branch of the photovoltaic array is short-circuited and one photovoltaic module in the other branch has a shadow, a state when one photovoltaic module is short-circuited and one photovoltaic module has a shadow in each of two branches of the photovoltaic array, and a state when one photovoltaic module is short-circuited and two photovoltaic modules have shadows in each of two branches of the photovoltaic array.

In order to clearly and concisely express each typical operating state, the typical operating states may be expressed by state labels. The above thirteen typical operating states are expressed in the form of a table as follows:

TABLE 2

Thirteen typical operating states

| Category of operating state | State label | Description of typical operating state of photovoltaic array |
|---|---|---|
| Normal operation state | F1 | Each photovoltaic module in each branch is in normal operation |
| Short-circuit fault state | F2 | One photovoltaic module in one branch is short-circuited |
| | F3 | Two photovoltaic modules in one branch are short-circuited |
| | F4 | One photovoltaic module in each of two branches is short-circuited |
| Open-circuit fault state | F5 | One branch is open-circuited |
| Shadow fault state | F6 | One photovoltaic module in one branch has a shadow |
| | F7 | One photovoltaic module in each of two branches has a shadow |
| | F8 | One photovoltaic module in one branch has a shadow, and two photovoltaic modules in the other branch have shadows |
| | F9 | Two photovoltaic modules in each of two branches have shadows |
| Hybrid fault state | F10 | One branch is open-circuited, and one photovoltaic module in the other branch has a shadow |
| | F11 | One photovoltaic module in one branch is short-circuited, and one photovoltaic module in the other branch has a shadow |
| | F12 | One photovoltaic module is short-circuited and one photovoltaic module has a shadow in each of two branches |
| | F13 | One photovoltaic module is short-circuited and two photovoltaic modules have shadows in each of two branches |

When the photovoltaic array is in different operating states, the U-I output characteristic curves and the U-P output characteristic curves of two branches in the photovoltaic array and the entire photovoltaic array are different. Taking the U-I output characteristic curves as an example, the U-I output characteristic curves when the photovoltaic array is in the operating state corresponding to the state label F1 are shown in FIG. 5-*a*, the U-I output characteristic curves when the photovoltaic array is in the operating state corresponding to the state label F2 are shown in FIG. 5-*b*, the U-I output characteristic curves when the photovoltaic array is in the operating state corresponding to the state label F5 are shown in FIG. 5-*c*, the U-I output characteristic curves when the photovoltaic array is in the operating state corresponding to the state label F8 are shown in FIG. 5-*d*, and the U-I output characteristic curves when the photovoltaic array is in the operating state corresponding to the state label F13 are shown in FIG. 5-*e*.

It should be noted that, in the above figures, because of the coincidence of the curves, marks on the curves are superimposed, for example, the coincidence of the curves of the branch B and the array may result in the display of hexagons on the figures, but those skilled in the art may understand the practical meanings in the figures. In addition, the U-I output characteristic curves when the photovoltaic array is in other typical operating states are not further exemplified in the present application.

Step 3, a fault feature vector is constructed. Mainly when the photovoltaic array is in each typical operating state, circuit parameter groups corresponding to each branch and a trunk in the photovoltaic array are acquired respectively, and the photovoltaic modules are approximately at a light intensity interval of [800, 900] W/m2 and a temperature interval of [40, 50]° C. Each circuit parameter group includes k circuit parameters, and k is a positive integer. In the present application, k=4, four parameters including open-circuit voltage Voc, short-circuit current Isc, maximum power point voltage Vm, and maximum power point current Im are acquired to constitute the circuit parameter group, because the four parameters can well describe the U-I output characteristic curves of the photovoltaic modules.

In the photovoltaic array, a total of n+1 circuit parameter groups are acquired, and each circuit parameter group includes k circuit parameters. Thus, a p-dimensional fault feature vector can be constructed according to the acquired circuit parameter groups, where p=k*(n+1). The 3*2 photovoltaic array exemplified in the present application mainly includes two branches and a trunk, so it is necessary to acquire Voc, Isc, Vm, and Im of the two branches and the trunk, and a 12-dimensional fault feature vector is obtained.

Step 4, after the fault feature vector is obtained, a data sample set of the photovoltaic array can be summarized and constructed. The method for summarizing the data sample set by the fault feature vector is known to those skilled in the art, and therefore is not described in the present application. The data sample set is divided to obtain a training sample set and a test sample set which are generally divided in a ratio of 2:1.

Step 5, a photovoltaic array fault diagnosis model based on the random forest algorithm is constructed. It is assumed that the training sample set is X, p is the dimension of the fault feature vector, and in the 3*2 photovoltaic array exemplified in the present application, p=12; and s is the number of decision trees to be established in fault diagnosis, s≥2, and s is a positive integer. Then, the step of constructing a photovoltaic array fault diagnosis model based on the random forest algorithm by using the training sample set can be briefly described as follows:

1. s times of sampling with replacement is performed on the training sample set, where a sub-training sample set is obtained by each sampling, a total of s sub-training sample sets are obtained, the i-th sub-training sample set is denoted as Xi, i is a parameter, and i=1, 2 . . . , s.

2. Each sub-training sample set is trained to obtain a decision tree, that is, a decision tree Qi is trained using the sub-training sample set Xi; when node splitting is performed, q fault features are randomly selected from p fault features, where q is a positive integer and q≤p; and a Gini coefficient corresponding to each fault feature in the q fault features is calculated, and the fault feature corresponding to the minimum Gini coefficient is used as an optimal splitting feature for node splitting. The calculation method of the Gini coefficients may use the conventional calculation formula, which is not described in detail in the present application.

3. The s decision trees Qi (i=1, 2 ..., s) are summarized to obtain a set, that is, the photovoltaic array fault diagnosis model.

Step 6, the photovoltaic array fault diagnosis model is tested. Using the test sample set to test the photovoltaic array fault diagnosis model, the indicators such as diagnosis accuracy, average training time and test time can be finally obtained.

To illustrate that the fault diagnosis method based on a random forest (RF) algorithm according to the present application is superior to the existing fault diagnosis methods based on a neural network (BP) and an extreme learning machine (ELM), the above method is applied to the same photovoltaic array to be diagnosed for fault diagnosis experiments, and the actual experimental results are shown in Table 3 below.

It can be seen from Table 3 that, the fault diagnosis method based on random forest (RF) is higher in diagnosis accuracy, and performs better in training and test time.

TABLE 3

RF, fault diagnosis results

| Diagnosis method | Training time/s | Test time/s | Diagnosis accuracy/% |
| --- | --- | --- | --- |
| BP | 2.6664 | 0.10852 | 96.92 |
| ELM | 0.3449 | 0.00663 | 97.69 |
| RF (present invention) | 0.3718 | 0.01052 | 98.46 |

Step 7, a photovoltaic array to be diagnosed is diagnosed using the tested photovoltaic array fault diagnosis model, that is, the s decision trees in the photovoltaic array fault diagnosis model are used for voting. Because the diagnosis results of the random forest are generated by voting, voting results of the s decision trees for each typical operating state are obtained. A fault diagnosis result of the photovoltaic array to be diagnosed can be obtained according to the voting results, that is, the operating state of each branch in the photovoltaic array to be diagnosed is determined. Generally, the typical operating state with the highest number of votes is the real-time operating state of the photovoltaic array to be diagnosed, that is, the type of fault of the photovoltaic array can be determined. Taking 20 decision trees as an example, some voting results of five groups of measured results and corresponding fault diagnosis results are shown in Table 4 below, expressed by state labels:

TABLE 4

Some voting results of five groups of measured results and diagnosis results, taking 20 decision trees as an example

| Number | Voting result | Fault diagnosis result | Fault truth value |
| --- | --- | --- | --- |
| 1 | F2: 19 votes, and F11: 1 vote | F2 | F2 |
| 2 | F5: 17 votes, and F10: 3 votes | F5 | F5 |
| 3 | F11: 10 votes, F7: 5 votes, F1: 2 votes, F4: 1 vote, and F6: 1 vote | F11 | F7 |
| 4 | F9: 11 votes, and F8: 9 votes | F9 | F8 |
| 5 | F11: 15 votes, F2: 4 votes, and F4: 1 vote | F11 | F11 |

It can be seen from Table 4 that, for the first group of data, the typical operating state corresponding to the state label F2 corresponds to a maximum number of votes (19 votes), then the diagnosis result is that the photovoltaic array to be diagnosed is in the typical operating state corresponding to the state label F2, that is, one photovoltaic module in one branch of the photovoltaic array to be diagnosed is short-circuited, and this diagnosis result is consistent with the fault truth value.

For the third group of data, the typical operating state corresponding to the state label F11 corresponds to a maximum number of votes (10 votes), then the diagnosis result is that the photovoltaic array to be diagnosed is in the typical operating state corresponding to the state label F10, that is, one branch of the photovoltaic array to be diagnosed is open-circuited, and one photovoltaic module in the other branch has a shadow. Although this diagnosis result is inconsistent with the fault truth value, since the voting result corresponding to each typical operating state is obtained in the present application, even if this diagnosis error occurs, the type of the actual operating state also appears in the voting statistics (the typical operating state corresponding to the state label F7 corresponds to 5 votes, the second maximum number of votes), which is equivalent to an alternative diagnosis result. Staff can acquire the number of votes in each typical operating state and check the statistics of the votes to find out the type of a possible fault. Even if the diagnosis corresponding to the maximum votes has an error, the fault can still be cleared in turn according to the number of votes. That is, the present application actually provides a diagnosis route, thereby improving the maintenance efficiency, and shortening the downtime of a system.

Embodiment 2

Figure 6:
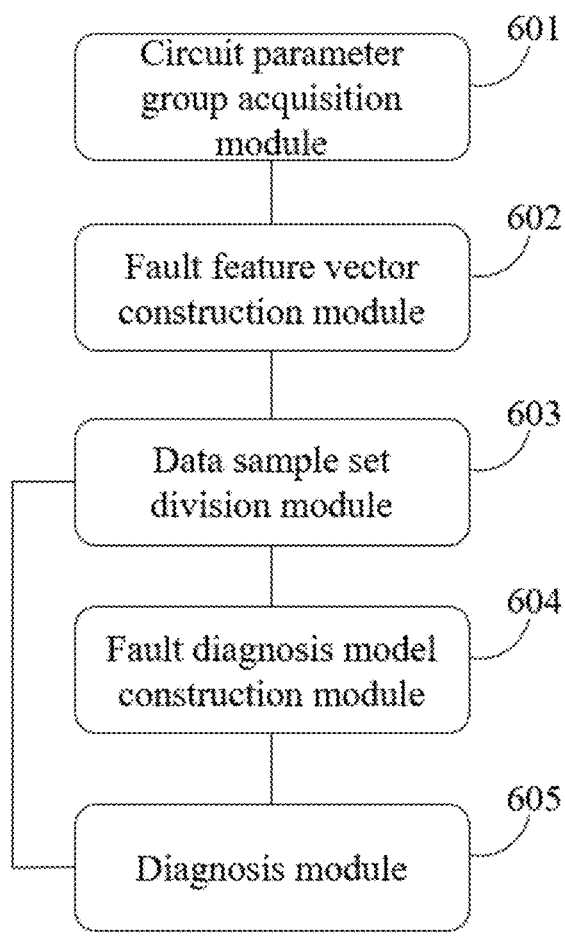
FIG. 6 is a composition diagram of a photovoltaic array fault diagnosis apparatus according to the present disclosure.

The present embodiment provides a photovoltaic array fault diagnosis apparatus based on a random forest algorithm. Referring to FIG. 6, the photovoltaic array fault diagnosis apparatus includes:

a circuit parameter group acquisition module 601, a fault feature vector construction module 602, a data sample set division module 603, a fault diagnosis model construction module 604, and a diagnosis module 605.

The circuit parameter group acquisition module 601 is configured to acquire circuit parameter groups corresponding to each branch and a trunk in the photovoltaic array respectively when a photovoltaic array is in each typical operating state, each circuit parameter group including k circuit parameters, and k being a positive integer. The photovoltaic array includes n branches, each branch including m photovoltaic modules, m and n being positive integers, and m≤4 and n≤4.

The fault feature vector construction module 602 is configured to construct a p-dimensional fault feature vector according to the n+1 circuit parameter groups acquired by the circuit parameter group acquisition module 601, where $p=k*(n+1)$.

The data sample set division module 603 is configured to construct a data sample set of the photovoltaic array according to the fault feature vector constructed by the fault feature vector construction module 602, and divide the data sample set into a training sample set and a test sample set.

The fault diagnosis model construction module 604 is configured to construct a photovoltaic array fault diagnosis model based on the random forest algorithm by using the training sample set.

The diagnosis module 605 is configured to test the photovoltaic array fault diagnosis model by using the test sample set, the photovoltaic array fault diagnosis model including s decision trees, s≥2 and s being a positive integer;

diagnose a photovoltaic array to be diagnosed by using the photovoltaic array fault diagnosis model after the test is completed, to obtain voting results of the s decision trees for each typical operating state; and obtain a fault diagnosis result of the photovoltaic array to be diagnosed according to the voting results for each typical operating state, the fault diagnosis result being used to indicate an operating state of each branch in the photovoltaic array.

The fault diagnosis model construction module 604 constructs the photovoltaic array fault diagnosis model by using the training sample set, including:

performing s times of sampling with replacement on the training sample set, where a sub-training sample set is obtained by each sampling, and a total of s sub-training sample sets are obtained;

training by using each sub-training sample set to obtain a decision tree; and summarizing the s decision trees obtained by the training to obtain a set, that is, the photovoltaic array fault diagnosis model.

In the process of training the decision tree by using the sub-training sample set, when node splitting is performed, q fault features are randomly selected from p fault features, where q is a positive integer and q≤p; and a Gini coefficient corresponding to each fault feature in the q fault features is calculated, and the fault feature corresponding to the minimum Gini coefficient is used as an optimal splitting feature for node splitting.

When the circuit parameter group acquisition module 601 acquires circuit parameter groups corresponding to each branch and a trunk in the photovoltaic array, each circuit parameter group includes an open-circuit voltage, a short-circuit current, a maximum power point voltage, and a maximum power point current.

When n=2 and m=3, the photovoltaic array has five categories, totally twelve subcategories of typical operating states. For details, reference may be made to the content in Embodiment 1.

Some of the steps in the embodiments of the present disclosure may be implemented by software, and a corresponding software program may be stored in a readable storage medium, such as an optical disk or a hard disk, etc.

The foregoing descriptions are merely preferred embodiments of the present disclosure, but are not intended to limit the present disclosure. Any modification, equivalent substitution, improvement and the like made within the spirit and principle of the present disclosure shall fall within the protection scope of the present disclosure.

What is claimed is:

1. A method for photovoltaic array fault diagnosis based on a random forest algorithm, comprising:

determining typical operating states of a photovoltaic array during operation, the photovoltaic array comprising n branches, each branch comprising m photovoltaic modules, wherein m and n are positive integers, m≤4 and n≤4;

acquiring circuit parameter groups corresponding to each branch and a trunk in the photovoltaic array, respectively, when the photovoltaic array is in each typical operating state, each circuit parameter group comprising k circuit parameters, wherein k is a positive integer;

constructing a p-dimensional fault feature vector according to the acquired n+1 circuit parameter groups, where p=k*(n+1);

constructing a data sample set of the photovoltaic array according to the fault feature vector, and dividing the data sample set into a training sample set and a test sample set;

constructing a photovoltaic array fault diagnosis model based on the random forest algorithm by using the training sample set, and testing the photovoltaic array fault diagnosis model by using the test sample set, the photovoltaic array fault diagnosis model comprising s decision trees, wherein s≥2, and s is a positive integer;

diagnosing a photovoltaic array to be diagnosed by using the tested photovoltaic array fault diagnosis model to obtain voting results of the s decision trees for each typical operating state; and obtaining a fault diagnosis result of the photovoltaic array to be diagnosed according to the voting results for each typical operating state, the fault diagnosis result being used to indicate an operating state of each branch in the photovoltaic array;

wherein when n=2 and m=3, the typical operating states of the photovoltaic array comprise five categories, and a total of twelve subcategories, which are as follows:

a first category is a normal operating state, and the first category comprises one subcategory, which is a state when each photovoltaic module in each branch of the photovoltaic array is in normal operation;

a second category is a short-circuit fault state, and the second category comprises three subcategories, which are a state when one photovoltaic module in one branch of the photovoltaic array is short-circuited, a state when two photovoltaic modules in one branch of the photovoltaic array are short-circuited, and a state when one photovoltaic module in each of two branches of the photovoltaic array is short-circuited, respectively;

a third category is an open-circuit fault state, and the third category comprises one subcategory, which is a state when one branch of the photovoltaic array is open-circuited;

a fourth category is a shadow fault state, and the fourth category comprises three subcategories, which are a state when one photovoltaic module in one branch of the photovoltaic array has a shadow, a state when one photovoltaic module in each of two branches of the photovoltaic array has a shadow, a state when one photovoltaic module in one branch of the photovoltaic array has a shadow and two photovoltaic modules in the other branch have shadows, and a state when two photovoltaic modules in each of two branches of the photovoltaic array have shadows, respectively; and a fifth category is a hybrid fault state, and the fifth category comprises four subcategories, which are a state when one branch of the photovoltaic array is open-circuited and one photovoltaic module in the other branch has a shadow, a state when one photovoltaic module in one branch of the photovoltaic array is short-circuited and one photovoltaic module in the other branch has a shadow, a state when one photovoltaic module is short-circuited and one photovoltaic module has a shadow in each of two branches of the photovoltaic array, and a state when one photovoltaic module is short-circuited and two photovoltaic modules have shadows in each of two branches of the photovoltaic array, respectively.

2. The method according to claim 1, wherein the constructing the photovoltaic array fault diagnosis model based on the random forest algorithm by using the training sample set comprises:
performing s times of sampling with replacement on the training sample set, wherein a sub-training sample set is obtained by each sampling, and a total of s sub-training sample sets are obtained;
training by using each sub-training sample set to obtain a decision tree; and
summarizing the s decision trees obtained by the training to obtain a set, namely, the photovoltaic array fault diagnosis model.

3. The method according to claim 2, wherein the training by using the sub-training sample set to obtain the decision tree comprises:
randomly selecting q fault features from p fault features when node splitting is performed, where q is a positive integer and q≤p;
calculating a Gini coefficient corresponding to each fault feature in the q fault features; and
using the fault feature corresponding to the minimum Gini coefficient as an optimal splitting feature for node splitting.

4. The method according to claim 1, wherein k=4, and each circuit parameter group comprises an open-circuit voltage, a short-circuit current, a maximum power point voltage, and a maximum power point current.

5. A photovoltaic array fault diagnosis apparatus based on a random forest algorithm, comprising:
a circuit parameter group acquisition module, a fault feature vector construction module, a data sample set division module, a fault diagnosis model construction module, and a diagnosis module;
wherein the circuit parameter group acquisition module is configured to acquire circuit parameter groups corresponding to each branch and a trunk in the photovoltaic array respectively when a photovoltaic array is in each typical operating state, each circuit parameter group comprising k circuit parameters, and k being a positive integer; the photovoltaic array comprising n branches, each branch comprising m photovoltaic modules, and wherein m and n being positive integers, and m≤4 and n≤4;
the fault feature vector construction module is configured to construct a p-dimensional fault feature vector according to the n+1 circuit parameter groups acquired by the circuit parameter group acquisition module, where p=k*(n+1);
the data sample set division module is configured to construct a data sample set of the photovoltaic array according to the fault feature vector constructed by the fault feature vector construction module, and divide the data sample set into a training sample set and a test sample set;
the fault diagnosis model construction module is configured to construct a photovoltaic array fault diagnosis model based on the random forest algorithm by using the training sample set;
the diagnosis module is configured to test the photovoltaic array fault diagnosis model by using the test sample set, the photovoltaic array fault diagnosis model comprising s decision trees, s≥2, and s being a positive integer; diagnose a photovoltaic array to be diagnosed by using the photovoltaic array fault diagnosis model after the test is completed, to obtain voting results of the s decision trees for each typical operating state; and obtain a fault diagnosis result of the photovoltaic array to be diagnosed according to the voting results for each typical operating state, the fault diagnosis result being used to indicate an operating state of each branch in the photovoltaic array;
wherein when n=2 and m=3, the photovoltaic array has five categories, totally twelve subcategories of typical operating states, respectively:
the first category is a normal operating state, and the first category comprises one subcategory, which is a state when each photovoltaic module in each branch of the photovoltaic array is in normal operation;
the second category is a short-circuit fault state, and the second category comprises three subcategories, respectively a state when one photovoltaic module in one branch of the photovoltaic array is short-circuited, a state when two photovoltaic modules in one branch of the photovoltaic array are short-circuited, and a state when one photovoltaic module in each of two branches of the photovoltaic array is short-circuited;
the third category is an open-circuit fault state, and the third category comprises one subcategory, which is a state when one branch of the photovoltaic array is open-circuited;
the fourth category is a shadow fault state, and the fourth category comprises three subcategories, respectively a state when one photovoltaic module in one branch of the photovoltaic array has a shadow, a state when one photovoltaic module in each of two branches of the photovoltaic array has a shadow, a state when one photovoltaic module in one branch of the photovoltaic array has a shadow and two photovoltaic modules in the other branch have shadows, and a state when two photovoltaic modules in each of two branches of the photovoltaic array have shadows; and
the fifth category is a hybrid fault state, and the fifth category comprises four subcategories, respectively a state when one branch of the photovoltaic array is open-circuited and one photovoltaic module in the other branch has a shadow, a state when one photovoltaic module in one branch of the photovoltaic array is short-circuited and one photovoltaic module in the other branch has a shadow, a state when one photovoltaic module is short-circuited and one photovoltaic module has a shadow in each of two branches of the photovoltaic array, and a state when one photovoltaic module is short-circuited and two photovoltaic modules have shadows in each of two branches of the photovoltaic array.

6. The photovoltaic array fault diagnosis apparatus according to claim 5, wherein the fault diagnosis model construction module constructs the photovoltaic array fault diagnosis model by using the training sample set, comprising:
performing s times of sampling with replacement on the training sample set, wherein a sub-training sample set is obtained by each sampling, and a total of s sub-training sample sets are obtained;
training by using each sub-training sample set to obtain a decision tree; and
summarizing the s decision trees obtained by the training to obtain a set, namely, the photovoltaic array fault diagnosis model.

7. The photovoltaic array fault diagnosis apparatus according to claim 6, wherein in the process of training the decision tree by using the sub-training sample set, when node splitting is performed, q fault features are randomly selected from p fault features, wherein q is a positive integer and q≤p; and a Gini coefficient corresponding to each fault feature in the q fault features is calculated, and the fault feature corresponding to the minimum Gini coefficient is used as an optimal splitting feature for node splitting.

8. The photovoltaic array fault diagnosis apparatus according to claim 5, wherein when the circuit parameter group acquisition module acquires circuit parameter groups corresponding to each branch and a trunk in the photovoltaic array, each circuit parameter group comprises an open-circuit voltage, a short-circuit current, a maximum power point voltage, and a maximum power point current.

9. The photovoltaic array fault diagnosis apparatus according to claim 5, wherein the photovoltaic circuit is a small photovoltaic array, the number of branches of the small photovoltaic array is less than or equal to 4, and the number of photovoltaic modules connected in series in each branch is less than or equal to 4.

10. A method of using the apparatus according to claim 5 to diagnose a photovoltaic circuit, wherein the photovoltaic circuit is a photovoltaic array, the number of branches of the photovoltaic array is less than or equal to 4, and the number of photovoltaic modules connected in series in each branch is less than or equal to 4.

* * * * *